United States Patent [19]

Stephens

[11] Patent Number: 4,879,462
[45] Date of Patent: Nov. 7, 1989

[54] OPTO-ELECTRONIC SCALE-READING APPARATUS HAVING SPATIAL FILTER FOR WAVELENGTH SEPARATION

[75] Inventor: William F. N. Stephens, Glos, United Kingdom

[73] Assignee: Renishaw plc, Wotton-under-Edge, United Kingdom

[21] Appl. No.: 159,364
[22] PCT Filed: Jun. 22, 1987
[86] PCT No.: PCT/GB87/00435
§ 371 Date: Feb. 18, 1988
§ 102(e) Date: Feb. 18, 1988
[87] PCT Pub. No.: WO87/07945
PCT Pub. Date: Dec. 30, 1987

[30] Foreign Application Priority Data

Jun. 21, 1986 [GB] United Kingdom ............... 8615197

[51] Int. Cl.$^4$ .......................... H01J 5/16; H01J 40/14
[52] U.S. Cl. ............................... 250/237 G; 250/226
[58] Field of Search ............... 250/226, 227, 237 G, 250/231 R; 356/374

[56] References Cited

U.S. PATENT DOCUMENTS

| | | | |
|---|---|---|---|
| 3,648,055 | 3/1972 | De Lang | 250/231 R |
| 3,748,486 | 7/1973 | Russell | 250/231 R |
| 3,768,911 | 10/1973 | Erickson | 356/374 |
| 4,051,367 | 9/1977 | Sayce | 250/237 G |
| 4,079,252 | 3/1978 | Brake | 356/374 |
| 4,165,180 | 8/1979 | Failes | 250/226 |
| 4,242,000 | 12/1980 | Bergkvist | 356/374 |
| 4,286,871 | 9/1981 | Erickson | 250/237 G |
| 4,349,277 | 9/1982 | Mundy et al. | 250/237 G |
| 4,600,304 | 7/1986 | Kafri et al. | 356/374 |
| 4,677,293 | 6/1987 | Michel | 250/237 G |
| 4,689,485 | 8/1987 | McMurtry | 250/226 |

FOREIGN PATENT DOCUMENTS 1299894 7/1969 Fed. Rep. of Germany .
WO86/03833 7/1986 PCT Int'l Appl. .

Primary Examiner—David C. Nelms
Assistant Examiner—William L. Oen
Attorney, Agent, or Firm—Spencer & Frank

[57] ABSTRACT

The invention provides an opto-electronic scale reading apparatus wherein a read head comprises a lens adapted to project a beam of collimated light through a spatial filter on to a scale having lines. Light reflected from the scale passes back through the filter and through the lens to a phase discrimination circuit. The filter comprises two gratings co-operating to produce light modulations corresponding to the scale lines. Since the light passes twice through the filter the latter has improved ability to exclude scale lines not having the periodicity demanded by the filter.

11 Claims, 3 Drawing Sheets

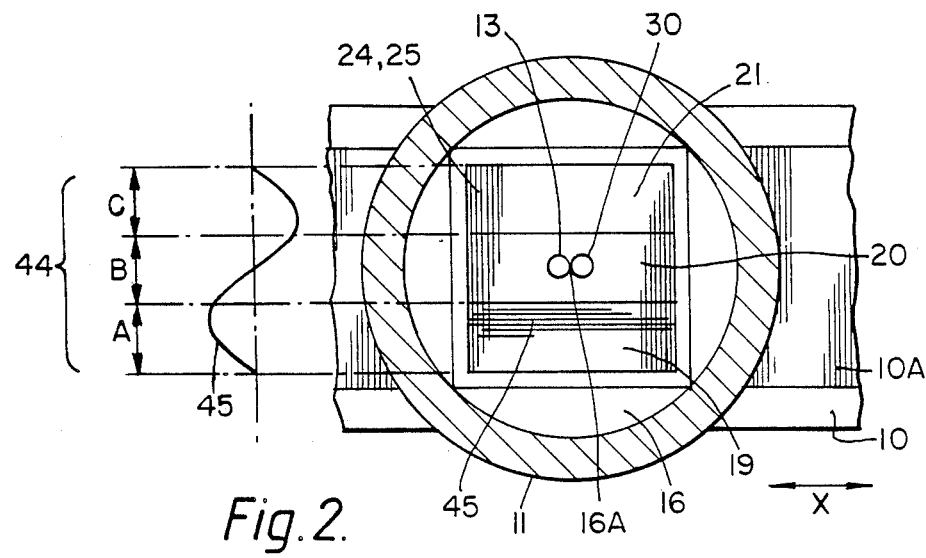
Fig. 2.
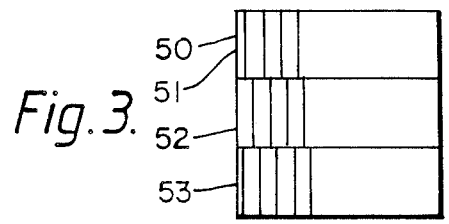
Fig. 3.
Fig. 5.
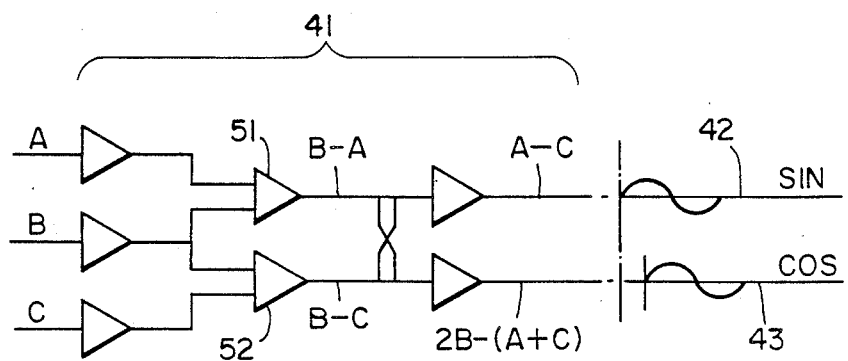

OPTO-ELECTRONIC SCALE-READING APPARATUS HAVING SPATIAL FILTER FOR WAVELENGTH SEPARATION

BACKGROUND OF THE INVENTION

This invention relates to opto-electronic scale-reading apparatus. International Publication No. WO86/03833 published July 3rd, 1986 discloses an opto-electronic scale-reading apparatus comprising a scale defined by spaced lines, a read head, the read head and the scale being movable one relative to the other in the direction of spacing of the lines, the read head comprising projecting means for projecting light on to the scale along a first path, the scale co-operating to pass on the light from the projecting means along a second path, the light so passed on having a pattern corresponding to the spacing of the lines, receiving means for receiving the light as passed on by the scale along said second path, and spatial filter means arranged in said second path for determining that, regarding the pattern passed on from the scale, substantially only lines of a given periodicity are transmitted by the spatial filter means.

SUMMARY OF THE INVENTION

It is an object of this invention to improve the efficiency of spatial filtering in an opto-electronic scale-reading apparatus.

The invention provides an opto-electronic scale reading apparatus wherein a read head comprises a lens adapted to project a beam of collimated light through a spatial filter on to a scale having lines. Light reflected from the scale passes back through the filter and through the lens to a phase discrimination circuit. The filter comprises two gratings co-operating to produce light modulations corresponding to the scale lines. Since the light passes twice through the filter the latter has improved ability to exclude scale lines not having the periodicity demanded by the filter.

BRIEF DESCRIPTION OF THE DRAWINGS

An embodiment of apparatus according to this invention will now be described with reference to the accompanying drawings wherein:

FIG. 2 is a section of the read head and scale of FIG. 1 together with a phase diagram of a moire fringe.

FIG. 3 is a view similar to FIG. 2 showing a modified grating.

FIG. 5 is a circuit diagram.

DESCRIPTION OF A PREFERRED EMBODIMENT

Figure 1:
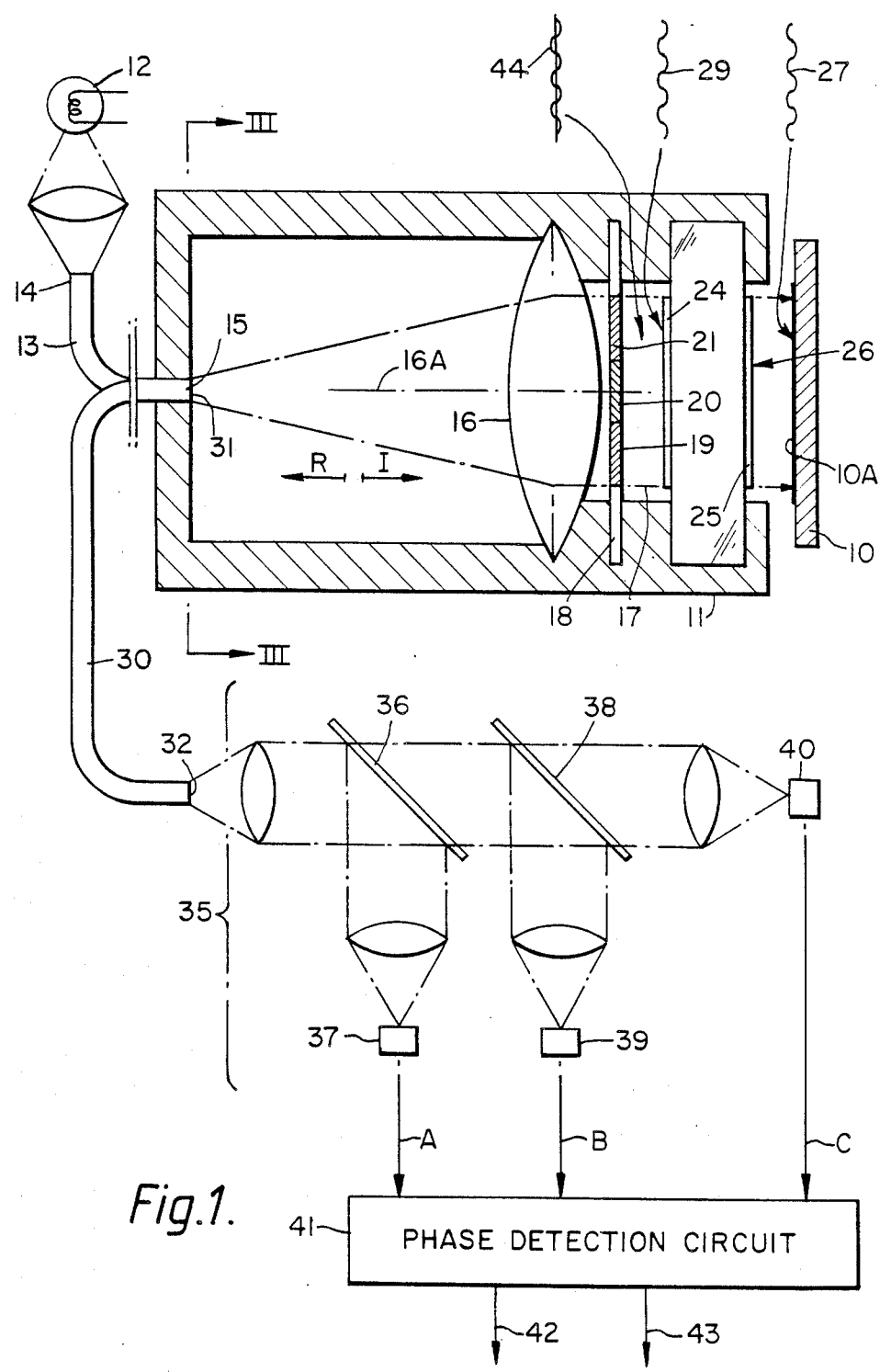
FIG. 1 is a sectional side view of a read head and scale combination together with a diagrammatic layout of an opto-electronic phase detection system.

Referring to FIGS. 1 and 2, a scale 10 has scale lines 10A spaced in the direction, X, of the length of the scale. A light source 12 is connected by an input optical fibre 13 to a read head 11 where an end 15 of the fibre is positioned to emit incident light on to a collimating lens 16 having an axis 16A. The incident collimated beam, denoted 17, passes through a colour filter 18 having three sections 19,20,21 of different colours, and further passes through a first grating 24 and a second grating 25. Light reflected from the scale 10 passes back through the gratings, the colour filter 18 and the lens 16, and is focussed by the lens onto one end 31 of an output optical fibre 30 situated in close proximity with the end 15 of the fibre 13, the ends 15,31 being situated at opposite sides of the axis 16A. The fibre 30 connects the read head 11 to a colour-discriminator 35 having a first dichroic filter 36 for reflecting the colour of the section 19 on to a sensor 37 while transmitting the other two colours, a second dichroic filter 38 for reflecting the colour of the section 20 on to a senosr 39, and sensor 40 for sensing the remaining colour, i.e. that of the section 21. The sensors 37,39,40, whose outputs are denoted A,B,C, are connected to a phase detection circuit 41 whose outputs 42,43 represent the sine and cosine terms of light modulations 44 (FIG. 1) produced by the gratings 24,25. The colour filter 18 constitutes a phase determining means 18. The filter 18 and the discriminator 35 constitute a phase detection system.

Referring to FIG. 5, the circuit 41 comprises differential amplifiers 51,52 for producing signal values B-A and B-C, and further differential amplifiers connected to produce signal values A-C and 2B-(A+C) which define respectively the outputs 42,43, i.e. the sine and cosine terms of any one of the signals A,B,C.

The read head 11 is supported for movement along the scale. The purpose of phase detection is to enable determination of direction of such movement, and possibly also to enable interpolation between successive cycles of the modulations 44. In the present example phase detection is enabled by a moire fringe 45 (FIG. 2) produced by angular offset between the gratings 24, 25 about the axis 16A. The offset is equal to one grating pitch so that each cycle of the modulations is accompanied by one moire fringe 45 passing over the grating 24. The filter sections 19, 20, 21 are positioned to colour-code the modulation cycle in terms of three phases as required for the circuit 41. The purpose of the colour-coding is to enable the phases to be transmitted through the single fibre 30.

The actual "reading" of the scale is constituted by counting of the cycles of the modulations 44 by a counter (not shown) operated by the signals 42,43 in a manner known per se. In a modification (FIG. 3), the grating 24 is replaced by a grating 50 comprising grating sections 51,52,53 which are mutually offset to define three phases replacing the moire phases described with reference to FIGS. 1,2. Here again, the colour filter 18 is used to encode the three phases and make it possible to output them through a single output fibre, i.e. the fibre 30.

Figure 4:
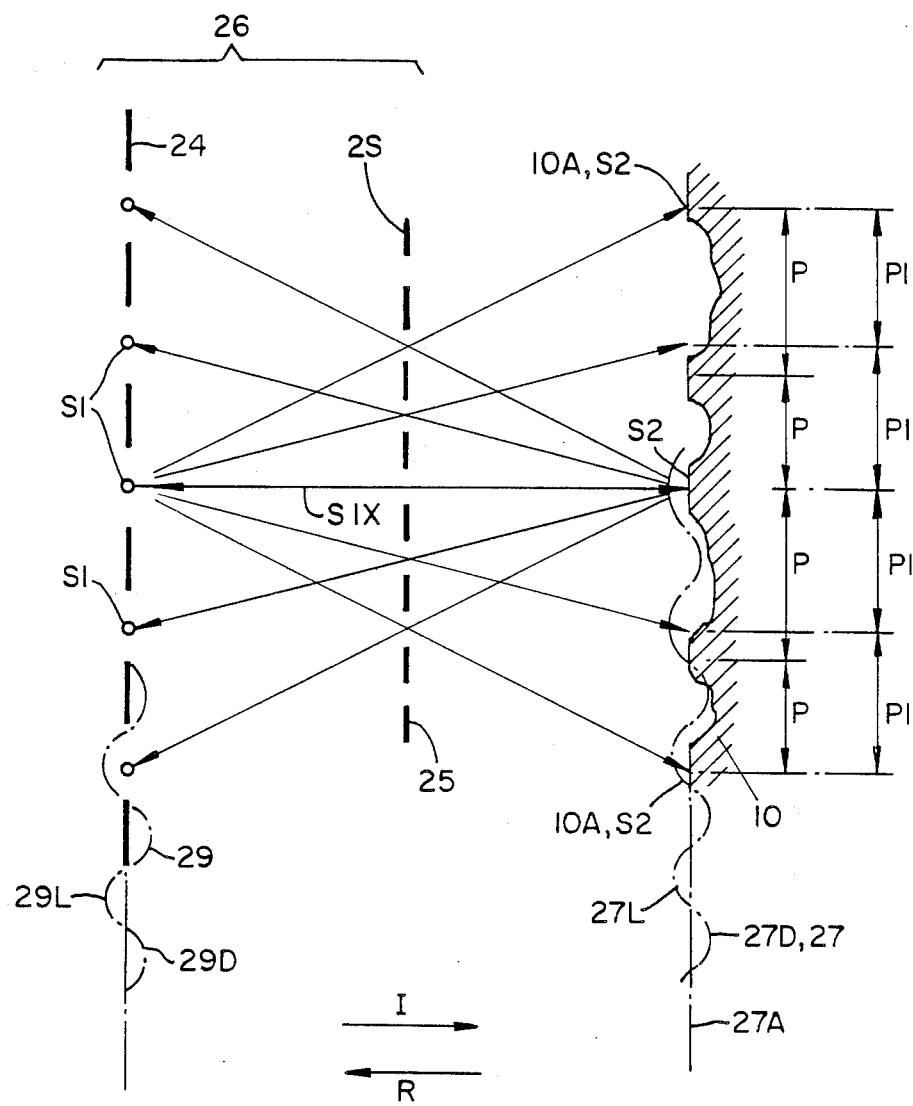
FIG. 4 is an enlarged detail of FIG. 1 and shows the optical geometry of a spatial filter being part of the apparatus.

The generation of the modulations 44 will now be described in detail with additional reference to FIG. 4. The path of the light of the lens to the scale, referred to as the first or incident path, is indicated by an arrow I, and the path of the reflected light, referred to as the second or reflected path, is indicated by an arrow R. The gratings 24, 25 constitute a grating means 26 functioning as a two-way spatial filter. In the incident path, the light coming through the grating 24 constitutes light sources S1 which interact with the grating 25 to produce interference fringes 27 in a plane 27A. The read head is positioned for the plane 27A to lie at a surface of the scale containing the lines 10A. The fringes 27 are stationary relative to the read head 11 but move along the scale 10 and across the scale lines 10A in accordance with the movement of the read head. The bright regions 27L of the fringes 27 are reflected by the scale in a pattern corresponding to the lines 10A and these reflections constitute light sources S2 which interact with the grating 25 to produce interference fringes 29 at the plane of the grating 24. During movement of the read head along the scale the fringes 29 move across the lines of the grating 24 and appear at the lens side of the grating 24 as the light modulations 44 which, as mentioned, are focussed by the lens onto the end 31 of the fibre 30.

It will be appreciated from what is disclosed in said International Publication No. 86/03833 that the spacing, P, of the lines 10A may vary so that there can be generated a pattern of many light sources having such a varied spacing. However, the interference mechanism, whereby the grating 25 produces the fringes 29, responds substantially only to those light sources which have a spacing P1, or a multiple thereof, satisfying the geometry of this interference mechanism. In other words, the grating 25 is a spatial filter capable of passing or transmitting only a pattern of light sources having the spacing P1, i.e. only those scale lines 10A, having a periodicity lying within the pass band of this filter. The output of the filter is made manifest by the grating 24 in terms of the modulations 44. A movement of the read head corresponding to one cycle of the modulations 44 may be regarded as a unit of displacement and it is clear that this unit is determined primarily by the read head rather than by the scale.

It has been found that the illumination of the scale through the grating 24, and the consequent generation of the fringes 27, causes the scale to be illuminated selectively at locations having the very pitch P1 required for the light sources S2. This reinforces the filtering action. The reinforcing mechanism may be explained by reference to a modulation produced in the second light sources S2 by the relative movement of the lines 10A and the fringes 29 during movement of the read head along the scale. As the second light sources S2 produce the second fringes 29, the modulations of the sources S2 reinforce the modulations 44 produced by movement of the fringes 29 across the grating 24. Further, because each source S1 has rays such as S1X perpendicular to the scale, the reflection from the scale can be to a significant extent specular with consequent benefit regarding optical efficiency.

For the purpose of actual dimensions of the grating means 26 and its spacing from the scale 10, reference is made to our said International Publication No. 86/03833. The formulae given therein establishing the relationship between the pitch of the gratings, and the spacing of the gratings and of the scale, apply equally to the present invention. It is noted also that the grating means 26 and the scale 10 are symmetrical with respect to the grating 25 in the sense that the filtering action and fringe formulation are in principle the same during the incident path I and the reflected path R, but the reinforcing mechanism applies of course only to the reflected pass. In other words, relevant diffraction occurs only at the grating 25. The grating 24 only acts to generate light sources for the incident path and the scale 10 only acts to provide light sources for the reflected path. Thus only the grating 25 need have the optical quality necessary for diffraction.

What is claimed is:

1. A opto-electronic scale reading apparatus comprising
    a scale defined by spaced lines, the spacing of said lines defining a nominal periodicity; and
    a read head moveable relative to said scale in the direction of the spacing of said lines, said read head including:
        a projecting means for projecting a beam of incident light;
        a fringe generator disposed in the path of said incident beam, said fringe generator generating on said scale a fringe pattern having said nominal periodicity, said scale transmitting light defining said fringe pattern; and
        spatial filter means disposed in the path of the light transmitted by said scale, said filter means preventing the passage therethrough of a fringe pattern whose spatial periodicity departs from said nominal periodicity by more than a given value.

2. An apparatus according to claim 1 wherein said scale transmits said incident light by reflection.

3. An apparatus according to claim 1 wherein said fringe generator comprises a grating means.

4. Apparatus according to claim 1 wherein said spatial filter means comprises a grating means.

5. Apparatus according to claim 1 wherein said projecting means projects collimated light.

6. Apparatus according to claim 2 wherein said projecting means produces said incident beam nominally at right angles to a scale plane, said scale plane being defined as a plane including said spaced lines, whereby the reflected light is returned in a direction opposite to that of said beam of incident light, and a single grating means serves as both said fringe generator and said spatial filter means.

7. Apparatus according to claim 6 wherein said single grating means comprises first and second spaced apart gratings, said grating means being spaced from said scale so that incident light passes in succession through said first and second gratings, said second grating generating first diffraction fringes in said scale plane, the reflected light passing in succession through said second and first gratings so that the second grating generates second diffraction fringes in the plane of said first grating.

8. Apparatus according to claim 7 wherein one of said first and second gratings is positioned with the grating lines thereof angularly offset relative to those of the other grating about an axis perpendicular to the planes of the gratings thereby generating, at said first grating, light modulations in terms of moire fringes, and wherein a phase determination means is provided to determine selected phases of said moire fringes.

9. Apparatus according to claim 8 wherein said first and second gratings are positioned with the lines of said first grating parallel to those of said second grating, and one of said first and second gratings comprises sections having respective lines offset from the lines of the other grating thereby generating, at said first grating, light modulations having a phase separation corresponding to the offset of said sections, and wherein a phase determination means is provided for determining the respective phases of the modulations.

10. Apparatus according to claim 6 wherein said projecting means comprise a single light source and a collimating lens, said light source being situated at the focussing side of said lens and said grating means being situated at the collimating side of said lens.

11. Apparatus according to claim 10 wherein said phase determining means comprise colour filter means for encoding the respective said phases, the apparatus further comprising a single light guide having one end thereof situated at a focal point of said lens for receiving the encoded phases, and colour-decoding means provided at the other end of said light guide for separating said phases.

* * * * *